United States Patent [19]

Schaffer et al.

[11] Patent Number: 5,243,678
[45] Date of Patent: Sep. 7, 1993

[54] ALIGNMENT COVER FOR A FIBER OPTIC RECEPTACLE

[75] Inventors: Ronald R. Schaffer, Harrisburg, Pa.; Gary N. Warner, Memphis, Tenn.

[73] Assignee: AMP Incorporated, Harrisburg, Pa.

[21] Appl. No.: 905,937

[22] Filed: Jun. 29, 1992

[51] Int. Cl.$^5$ ............................................. G02B 6/36
[52] U.S. Cl. ........................................ 385/134; 385/92
[58] Field of Search ................. 385/88, 89, 92, 93, 385/134, 138, 139; 361/392–394

[56] References Cited

U.S. PATENT DOCUMENTS

| 4,640,575 | 2/1987 | Dumas | 385/134 |
|---|---|---|---|
| 4,767,179 | 8/1988 | Sampson et al. | 350/96.20 |
| 4,779,950 | 10/1988 | Williams | 350/96.21 |
| 4,911,519 | 3/1990 | Burton et al. | 350/96.20 |
| 4,979,792 | 12/1990 | Weber et al. | 385/139 |
| 5,005,939 | 4/1991 | Arvanitakis et al. | 350/96.20 |
| 5,078,515 | 1/1992 | Soulard et al. | 385/89 |
| 5,127,073 | 6/1992 | Mulholland et al. | 385/92 |

Primary Examiner—John D, Lee
Assistant Examiner—John Ngo
Attorney, Agent, or Firm—Katherine A. Nelson; Driscoll A. Nina, Jr.

[57] ABSTRACT

A self-aligning optical receptacle cover (10) suitable for use with various types of optical receptacles (20). The cover (10) seals the receptacle (20) against dust and debris, and alignment pylons (16, 18) extending from receptacle cover (10) cooperate with active optical devices (30, 40) to maintain precise alignment thereof within the receptacle during manufacturing operations.

18 Claims, 3 Drawing Sheets

ALIGNMENT COVER FOR A FIBER OPTIC RECEPTACLE

FIELD OF THE INVENTION

The present invention relates to fiber optic connectors and, more particularly, to a cover for a fiber optic receptacle which seals the receptacle against dust and debris when the receptacle is not in use, and which maintains precise alignment of an active optical device within the receptacle during soldering or assembly.

BACKGROUND OF THE INVENTION

As fiber optic technology continues along its evolutionary path, there are occasional quantum technological advances. These advances break new ground and pave the way for new commercial applications. However, the technology is maturing, and the evolutionary thrust is now directed to refinements to existing fiber optic products. Recent improvements have led to advantages such as better optical transmission to reduced manufacturing costs.

An exemplary device which was developed to reduce manufacturing costs is the optical receptacle cover. Receptacle covers are attached to receptacles to prevent the entry of dust and debris (such as excess solder) during the assembly process.

Otherwise, when a plug is inserted in the receptacle, the presence of dust and debris can impede the alignment of the converging optical fibers. Anything less than perfect alignment may render the optical connection inoperative.

The conventional dust cover has been further refined. A rearwardly extending tab has been added to serve as a grip. This allows machinery or technicians to manipulate the receptacle more easily during the assembly process. When an active optical device has been inserted into the receptacle, the tab provides a means for holding the receptacle against a circuit board while the terminals of the active device are soldered to the conductive tracks of the board. The cover is simply removed when it is time to insert a mating plug.

Another key objective of efforts at furthering fiber optic technology is increasing the reliability of the resulting optical system. Efforts toward this end have focussed on developing safeguards to insure the quality of the optical components which go into a system and to insure the integrity of the assembly process. Transmission accuracy can be increased and signal losses reduced by maintaining a more precise alignment of the active optical device within the receptacle throughout the assembly process. Traditionally, this was accomplished only by sacrificing the ease of assembly of the receptacle. It would be far more convenient to employ the above-described receptacle cover for yet another purpose, namely, to maintain the proper alignment of the active optical device.

SUMMARY OF THE INVENTION

It is, therefore, an object of the present invention to provide a multi-purpose optical receptacle cover to prevent dust from entry in the receptacle while disconnected and to allow convenient manipulation of the receptacle during assembly.

It is another object to provide a receptacle cover as described above which serves to align an active optical device within the receptacle and which maintains the proper alignment of the active optical device throughout the assembly and soldering process.

In accordance with the above-described objects, the present invention is a self-aligning receptacle cover for protecting an optical fiber receptacle and aligning any active optical devices seated therein.

As will be appreciated to those skilled in the art, the invention may be modified to cooperate with any conventional fiber-optic receptacle of the type having an open-end for receiving an optical plug, a cavity for seating an active optical device (such as a photodiode, etc.) in a facing relation to the plug, and an open channel extending between the open face and the first cavity for providing a path for an optical fiber.

The receptacle cover of the present invention includes a shroud for insertion within the open end of the receptacle. The shroud conforms to the interior of the receptacle for maintaining a resistance fit therein. The receptacle cover also includes a stopper (or flange) encircling the shroud for limiting insertion within the receptacle and for sealing the open end of the receptacle when said receptacle cover is fully inserted. The receptacle cover further includes an alignment pylon extending interiorly within the shroud for aligning an active optical device. As the receptacle cover is inserted, the alignment pylon penetrates the channel and, when fully inserted, biases the active optical device into alignment with the receptacle channel.

BRIEF DESCRIPTION OF THE DRAWINGS

Other objects, features, and advantages of the present invention will become more apparent from the following detailed description of preferred embodiments and certain modifications thereof when taken together with the accompanying drawings, in which.

DETAILED DESCRIPTION OF THE PREFERRED EMBODIMENT(S)

Figure 1:
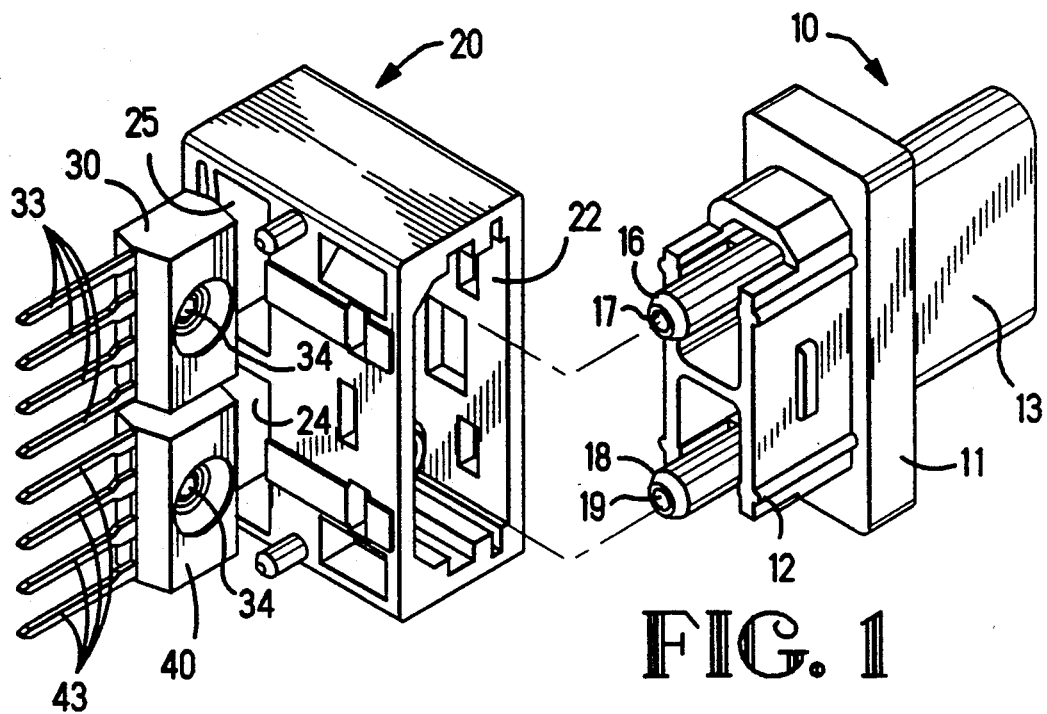
FIG. 1 is a perspective view of an optical receptacle cover according to the present invention showing the manner of insertion in a conventional duplex receptacle. The manner of inserting a pair of conventional active optical devices is also shown.

FIG. 1 illustrates an optical receptacle cover 10 according to one embodiment of the present invention. The receptacle cover 10 shown in FIG. 1 is specifically suited for insertion into one end of a receptacle having at least one active device mounted (ADM) therein. It should be understood that the scope of the present invention encompasses other-optical receptacle covers which are suited for insertion within other types of receptacles.

A pair of conventional active optical devices 30 and 40 is also shown to illustrate the manner of their insertion in the ADM duplex optical receptacle 20.

Duplex optical receptacle 20 comprises an outer shell which may be integrally molded or formed of mating parts. The receptacle 20 shell defines a central chamber with an open end 22 for receiving a mating plug (not shown) or receptacle cover 10. Side-by-side cavities 24 and 25 are formed proximate the opposite end of receptacle 20. Each cavity 24, 25 is dimensioned to receive a conventional active optical device 30, 40 as shown (such as a photo-diode, photo-transistor or the like). Devices 30 and 40 are seated within the cavities 24 and 25 of receptacle 20 such that they face the open end 22. The respective active optical devices 30 and 40 typically include a plurality of conductive terminals 33, 43 extending therefrom.

Figure 2:
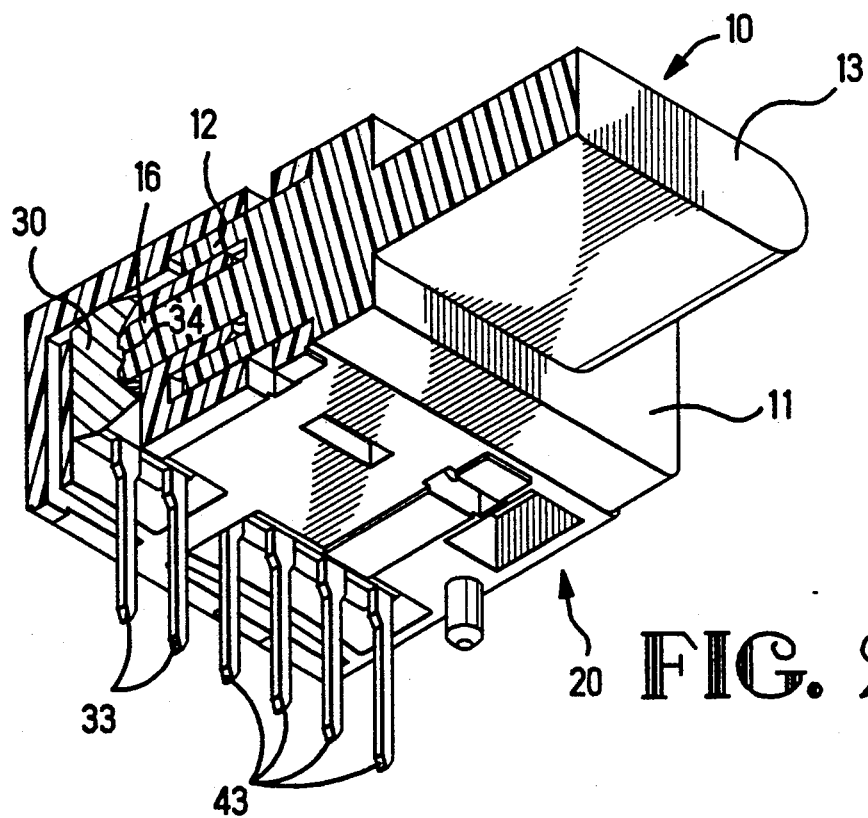
FIG. 2 is a perspective cross-section of the optical receptacle cover of FIG. 1 shown inserted in the duplex receptacle and serving to align the active optical devices.

The face of each optical device is typically concave and, as shown in FIG. 2, the concave portion is typically provided with an outwardly protruding dimple 34.

Receptacle cover 10 is generally shaped to conform to receptacle 20. Receptacle cover 10 includes a shroud 12 which is designed to be inserted within the open end 22 of receptacle 20.

Receptacle cover 10 also includes a tab portion 13 which protrudes outwardly from receptacle 20 when cover 10 is inserted therein. Tab 13 provides a convenient means for manipulating the receptacle 20 during soldering or other manufacturing operations.

Tab 13 and shroud 12 are separated by a stopper-flange 11. When cover 10 is completely inserted in receptacle 20, stopper-flange 11 completely covers the open end 22 of receptacle 20. This way, dust and debris is prevented from entering receptacle 20 when the receptacle cover 10 is in place.

Receptacle cover 10 also includes a pair of parallely-spaced pylons 16, 18 which extend within shroud 12. In the preferred embodiment, pylons 16 and 18 are defined by tapered (preferably frusto-conical) ends which are received in the concave faces of active optical devices 30 and 40. In the preferred embodiment, the tips of pylons 16 and 18 are each provided with a central cavity 17, 19 respectively, conforming to the dimples 34, 44 of active optical devices 30 and 40.

As shown in FIG. 2, when receptacle cover 10 is in place and shroud 12 is fully inserted, pylons 16 and 18 bear against the concave portion of the active devices 30 and 40 and bias the active optical devices 30 and 40 against the rear of the receptacle 20. As further pressure is applied, the specific dimensions of pylons 16 and 18 and the active optical devices 30 and 40 provide a self-aligning feature. Due to the pitched engagement between each of pylons 16, 18 and active devices 30 and 40, the active devices 30 and 40 are pressed into alignment with pylons 16, 18.

Protruding dimples 34, 44 of the active optical devices contribute to the precision of the alignment feature. Dimples 34, 44 fit within the small cavities 17, 19, which are centrally located at the tips of pylons 16 and 18 respectively. The 360° concentric bands of restraining force provided by the engaged dimples 34, 44 and conical tip of pylons 16 and 18 serve to securely anchor both active optical devices 30, 40 within receptacle 20 when cover 10 is in place.

Figure 3:
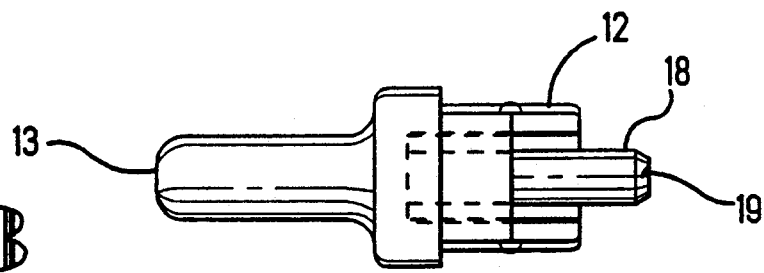
FIG. 3 is a side view of the optical receptacle cover of FIG. 1.
Figure 4:
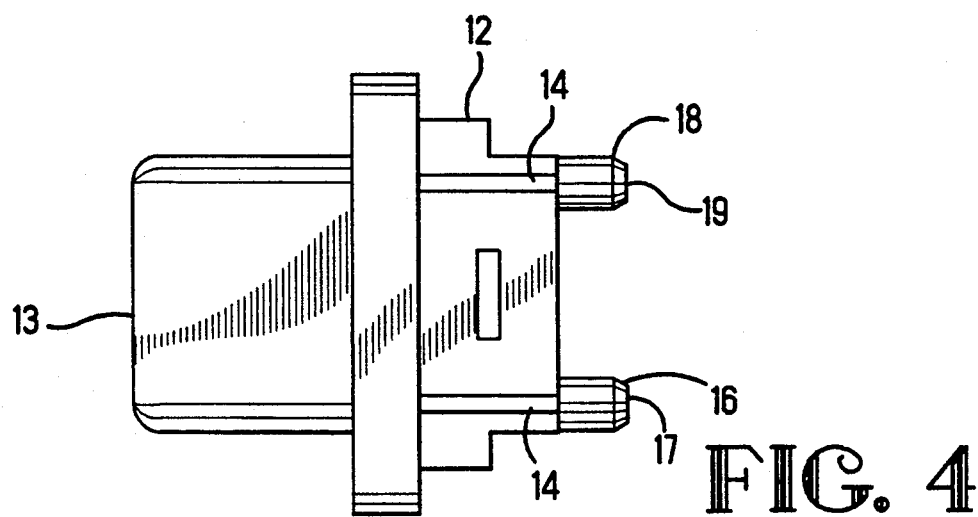
FIG. 4 is a top view of the optical receptacle cover of FIGS. 1-3.

FIGS. 3 and 4 show a side view and a top view, respectively, of the receptacle cover according to the present invention. Shroud 12 shrouds the pylons 16 and 18 and is designed to provide a resistance fit within the open face 22 of receptacle 20. Shroud 12 generally conforms to the open end 22 and, in the preferred embodiment, ribs 14 are provided along the top and bottom of receptacle cover 10 to insure a secure resistance fit when cover 10 is inserted within receptacle 20.

Figure 5:
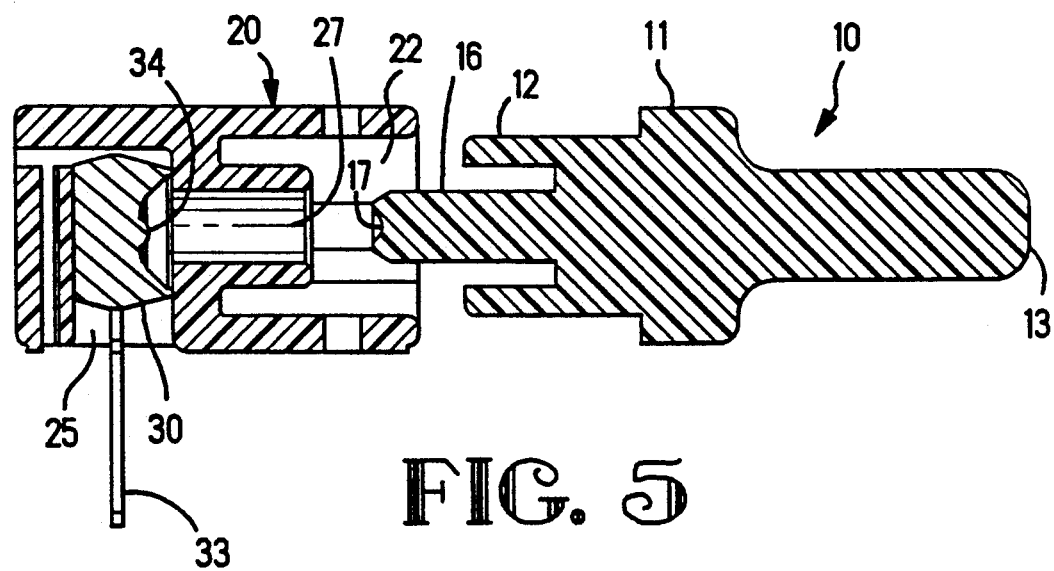
FIGS. 5-7 are a series of cross-section views of the optical receptacle cover of FIGS. 1-4 showing the insertion sequence within the duplex receptacle.

The operation, and especially the alignment feature, of the present invention will now be described with reference to the sequenced drawings of FIGS. 5-7. The active optical device 30 is initially seated within channel 25 of receptacle 20. A central channel 27 runs between cavity 25 and open end 22 of receptacle 20. Channel 27 is designed to hold an optical fiber from a plug (not shown) in optical communication with active optical device 30.

It is essential that the optical fiber be held in precise alignment with the active optical device 30. However, when device 30 is inserted into channel 25, there is typically a substantial degree of misalignment between active optical device 30 and channel 27, which would in turn result in a poor alignment with the optical fiber itself. The net result can be a poor optical connection.

The receptacle cover 10, according to the present invention, solves the above-described problem. As shown in FIG. 5, receptacle cover 10 is inserted into receptacle 20, pylon 16 fits within channel 27, and the resilient shroud 12 fits within the open end 22 of receptacle 20 and provides a degree of resistance.

Figure 6:
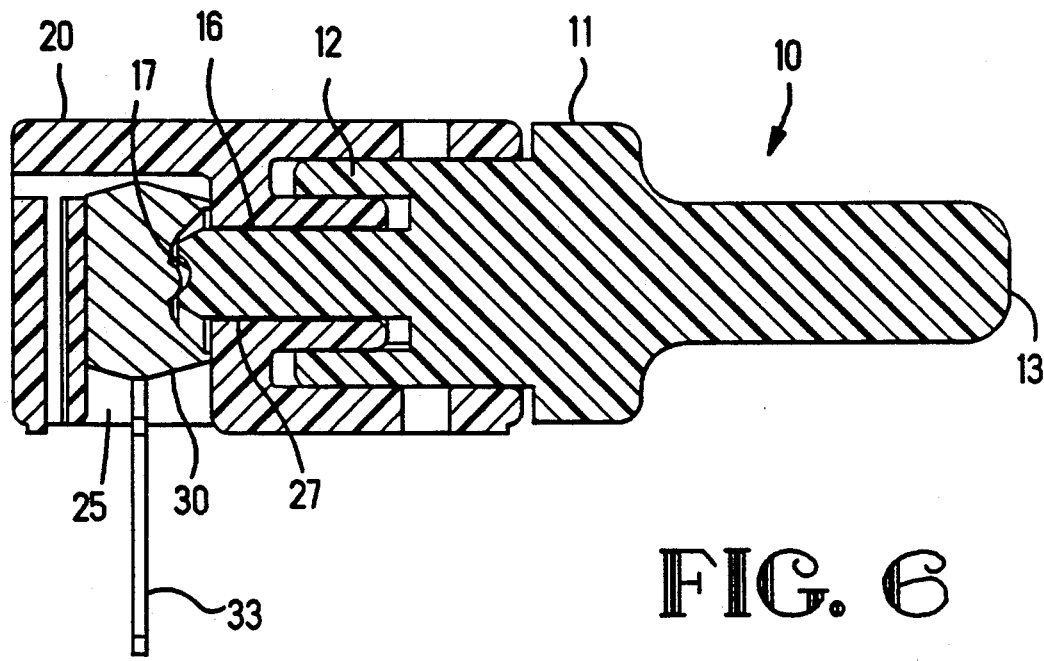
Figure 7:
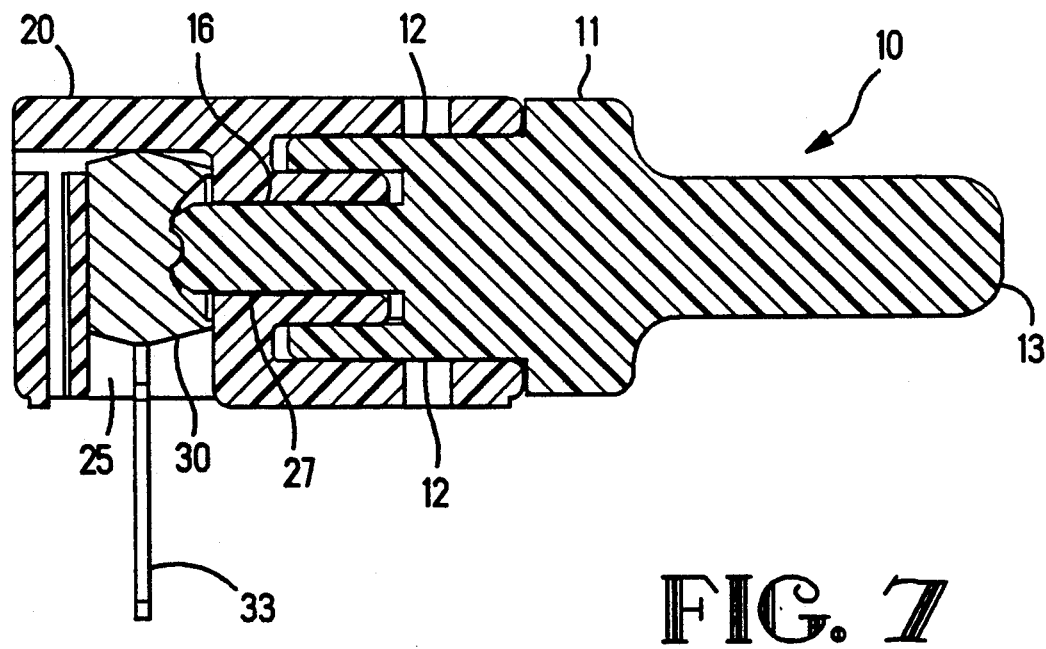

As shown in FIG. 6, insertion continues until pylon 16 engages the active optical device 30. If a misalignment exists, the frusto-conical tip of pylon 16 bears against the concave portion of optical device 30 and tends to center the device 30. As further insertion pressure is applied, pylon 16 biases optical device 30 into precise alignment, and the cavity at the tip of pylon 16 cooperates with dimple 34 and anchors active optical device 30 in the aligned position.

The length of pylon 16 is carefully measured so that flange 11 sits flush and provides a tight seal against the open end 22 of receptacle 20 when pylon 16 is fully engaged with optical device 30.

In this position, ribs 14 on shroud 12 of receptacle cover 10 provide a secure resistance fit. Hence, the precise alignment of active optical device 30 is maintained so long as receptacle cover 10 is inserted. This feature is extremely useful during the assembly process, especially while terminals 33 and 43 are soldered to a supporting circuit board.

When the assembly operation is complete, receptacle 10 is simply extracted from receptacle 20 and mating fiber optical plug (not shown) is inserted in its place. The optical fiber of the mating plug will extend through channel 27 of receptacle 20 in precise alignment with active optical device 30, and a reliable optical connection is assured.

Having now fully set forth the preferred embodiments and certain modifications of the concept underlying the present invention, various other embodiments as well as certain variations and modifications of the embodiments herein described will obviously occur to those skilled in the art upon becoming familiar with said underlying concept. It is to be understood, therefore, that within the scope of the appended claims, the invention may be practiced otherwise than as specifically set forth herein.

We claim:

1. A self-aligning receptacle cover for protecting an optical fiber receptacle and aligning an active optical device therein, said optical fiber receptacle including an open-end for receiving an optical plug, a first cavity for seating an active optical device in a facing relation to said plug, and an open channel between said open end and said first cavity for providing a fiber optic path therebetween, said receptacle cover comprising:

a shroud for insertion within the open end of said optical fiber receptacle, said shroud conforming to the interior of said receptacle for maintaining a resistance fit therein;

a stopper comprising a flange encircling said shroud for limiting insertion within said optical fiber receptacle and for sealing said open end of said optical fiber receptacle when said receptacle cover is fully inserted; and an alignment pylon extending interiorly within said shroud for aligning an active optical device, said alignment pylon penetrating said channel when said receptacle cover is inserted in said optical fiber receptacle, and said alignment pylon biasing said active optical device into alignment with said channel when said receptacle cover is fully inserted.

2. The receptacle cover according to claim 1, wherein said shroud is provided with a series of exterior ribs for improving the resistance fit within said optical fiber receptacle.

3. The receptacle cover according to claim 1, wherein said active optical device further comprises a concave portion, and said alignment pylon has a tapered tip to promote biasing of said active optical device into alignment.

4. The receptacle cover according to claim 3, wherein said active optical device further comprises a concave portion, and said alignment pylon has a frusto-conical tapered tip to promote biasing of said active optical device into alignment.

5. The receptacle cover according to claim 4, wherein said active optical device further comprises a dimple protruding centrally from said concave portion, and said frusto-conical tip of said alignment pylon has a central cavity conforming to said dimple to promote biasing of said active optical device into alignment.

6. The receptacle cover according to claim 1, further comprising a tab integral to said stopper and extending therefrom oppositely of said shroud to facilitate manipulation of said receptacle cover.

7. A self-aligning receptacle cover for protecting a duplex optical fiber receptacle and aligning a pair of active optical devices therein, said duplex receptacle including an open-end for receiving a duplex optical plug, a first cavity and a second cavity each for seating one of said active optical devices in a facing relation to said duplex plug, and a corresponding pair of open channels extending between each of said first cavity and second cavity and said open end for providing a fiber optic path from said open end to each of said cavities, said receptacle cover comprising:

a shroud for insertion within the open end of said duplex receptacle, said shroud conforming to the interior of said duplex receptacle to maintain a resistance fit therein;

a stopper comprising a flange encircling said shroud for limiting insertion of said receptacle cover into said duplex receptacle and for sealing said open end of said duplex receptacle when said receptacle cover is fully inserted; and a pair of alignment pylons extending from within said shroud for aligning said pair of active optical devices, each of said alignment pylons penetrating one of said channels when said receptacle cover is inserted in said duplex receptacle, and said alignment pylons each biasing one of said active optical device into alignment with the corresponding receptacle channel when said receptacle cover is fully inserted.

8. The duplex receptacle cover according to claim 7, wherein said shroud is provided with a series of exterior ribs for improving the resistance fit within said duplex receptacle.

9. The duplex receptacle cover according to claim 7, wherein said pair of active optical devices each further comprises a concave portion, and each of said alignment pylons has a tapered tip to promote biasing of the corresponding active optical device into alignment.

10. The duplex receptacle cover according to claim 9, wherein said pair of active optical devices each further comprises a concave portion, and said alignment pylons have a frusto-conical tapered tip to promote biasing of the corresponding active optical device into alignment.

11. The duplex receptacle cover according to claim 10, wherein said pair of active optical devices each further comprises a dimple protruding centrally from said concave portion, and said frusto-conical tip of said alignment pylons has a central cavity conforming to said dimples to promote biasing of said active optical devices into alignment.

12. The duplex receptacle cover according to claim 7, further comprising a tab integral to said stopper and extending therefrom oppositely of said shroud to facilitate manipulation of said receptacle cover.

13. A fiber-optic receptacle assembly, comprising:

a receptacle including an open-end for receiving an optical plug, at least one cavity for seating an active optical device in a facing relation to said plug, and an open channel between said open end and each of said cavities for providing a fiber optic path therebetween;

an active optical device seated in each of said cavities; and a self-aligning receptacle cover for protecting said receptacle and aligning said active optical device therein, said receptacle cover further including, a shroud for insertion within the open end of said receptacle, said shroud conforming to the interior of said receptacle for maintaining a resistance fit therein, a stopper comprising a flange encircling said shroud for limiting insertion within said receptacle and for sealing said open end of said receptacle when said receptacle cover is fully inserted, and an alignment pylon corresponding to each active optical device for alignment thereof, each pylon extending interiorly within said shroud, and each alignment pylon penetrating the open channel leading to an active optical device when said receptacle cover is inserted in said receptacle, said alignment pylon biasing the corresponding active optical device into alignment with said receptacle channel when said receptacle cover is fully inserted.

14. The receptacle assembly according to claim 13, wherein said shroud is provided with a series of exterior ribs for improving the resistance fit within said receptacle.

15. The receptacle assembly according to claim 13, wherein each active optical device further comprises a concave portion, and said corresponding alignment pylon has a tapered tip to promote biasing of said active optical device into alignment.

16. The receptacle assembly according to claim 15, wherein each active optical device further comprises a concave portion, and said corresponding alignment pylon has a frusto-conical tapered tip to promote biasing of said active optical device into alignment.

17. The receptacle assembly according to claim 16, wherein each active optical device further comprises a dimple protruding centrally from said concave portion, and said frusto-conical tip of said corresponding alignment pylon has a central cavity conforming to said dimple to promote biasing of said active optical device into alignment.

18. The receptacle assembly according to claim 13, further comprising a tab extending from said stopper oppositely of said shroud to facilitate manipulation of said receptacle cover.

* * * * *